United States Patent
Lu et al.

(10) Patent No.: US 11,906,358 B2
(45) Date of Patent: Feb. 20, 2024

(54) RECEIVER WITH A HADAMARD MASK FOR IMPROVING DETECTION RESOLUTION DURING A SCANNING PROCEDURE OF AN OPTICAL SENSING SYSTEM

(71) Applicant: BEIJING VOYAGER TECHNOLOGY CO., LTD., Beijing (CN)

(72) Inventors: Yue Lu, Los Gatos, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 17/552,223

(22) Filed: Dec. 15, 2021

(65) Prior Publication Data
US 2023/0184588 A1      Jun. 15, 2023

(51) Int. Cl.
*G01J 3/02*        (2006.01)
*G01S 17/89*      (2020.01)

(52) U.S. Cl.
CPC ............. *G01J 3/0229* (2013.01); *G01S 17/89* (2013.01)

(58) Field of Classification Search
CPC .... G01J 3/0229; G01J 2003/285; G01S 17/89
See application file for complete search history.

(56) References Cited

U.S. PATENT DOCUMENTS

| | | | | |
|---|---|---|---|---|
| 10,670,719 | B2* | 6/2020 | Wang | G02B 27/0961 |
| 2010/0033788 | A1* | 2/2010 | Xie | G06Q 10/06 438/106 |
| 2013/0113921 | A1* | 5/2013 | Richards | H04N 25/48 348/135 |
| 2020/0182975 | A1* | 6/2020 | Wang | G02B 27/30 |
| 2020/0209615 | A1* | 7/2020 | Lee | B81C 1/00404 |
| 2022/0307903 | A1* | 9/2022 | Zhou | G01J 3/0208 |

* cited by examiner

Primary Examiner — Tarifur R Chowdhury
Assistant Examiner — Carlos Perez-Guzman
(74) Attorney, Agent, or Firm — BAYES PLLC

(57) ABSTRACT

Embodiments of the disclosure include a receiver of an optical sensing system. The receiver may include a Hadamard mask configured to resonate during a scanning procedure performed by the optical sensing system. The Hadamard mask may include a frame beginning pattern corresponding to a start of a frame captured during the scanning procedure. The Hadamard mask may also include a coded pattern configured to provide sub-pixelization of the frame. The receiver may also include a photodetector array positioned on a first side of the Hadamard mask. The photodetector array may be configured to detect light that passes through the Hadamard mask during the scanning procedure to generate the frame.

20 Claims, 5 Drawing Sheets

RECEIVER WITH A HADAMARD MASK FOR IMPROVING DETECTION RESOLUTION DURING A SCANNING PROCEDURE OF AN OPTICAL SENSING SYSTEM

TECHNICAL FIELD

The present disclosure relates to a receiver for an optical sensing system, and more particularly to, a receiver that comprises a Hadamard mask configured to resonate during a scanning procedure to provide sub-pixelization of an image frame of the far field environment.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams that are steered towards an object in the far field using a scanning mirror, and then measuring the reflected pulses with a sensor. Differences in laser light return times, wavelengths, and/or phases (also referred to as "time-of-flight (ToF) measurements") can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Earlier iterations of optical sensing systems included electromechanical systems that were mounted on bases, which rotated mechanically to emit laser light in 360 degrees. In such systems, the optical sensor rotates to sense the surrounding area. These moving parts are manufactured with a high degree of precision to ensure measurements are obtained with a suitable degree of accuracy for autonomous navigation. Achieving this high level of precision is expensive and time consuming. For example, to achieve a desired detection resolution, the moving parts have to include large arrays of laser emitters and detectors. The large number of emitters and detector do not only increase the size of the moving parts, making it difficult to manufacture and assemble, the arrays also need to be precisely aligned to achieve the detection accuracy. In addition, moving parts may make the optical sensor less resilient to vibrations. Driving in rough terrain, for example, may negatively impact ToF measurements.

To overcome some of the problems of electromechanical systems, solid-state optical sensing systems and/or semi-solid-state optical sensing systems have been introduced with fewer moving parts. A solid-state system has two scanning axis, at least one of which is a solid-state axis implemented by a solid-state scanner, such as a MEMS scanning mirror or mirror array. The solid-state optical sensing system typically uses a 1D laser array as the laser source, such as an edge emitting laser bar with a plurality of emitters, and a 1D photodetector array. By using the rotating scanners, the laser emitter array and the photodetector array can be stationary and not part of the moving parts. While reducing the number of moving parts, conventional solid-state systems still face numerous challenges. One such challenge relates to the size of the laser array and photodetector array used in such systems. For example, to achieve a pixel number suitable for the resolution requirement of autonomous navigation, the size of the laser array and photodetector array used in such systems must be quite large. As a result, the pre-alignment issue persists and the manufacturing cost remains prohibitive.

Thus, there is a need for a semi-solid-state optical sensing system that achieves the resolution requirement for autonomous-driving applications, while at the same time reducing the size of the laser array and the photodetector array, as compared to known systems.

SUMMARY

Embodiments of the disclosure include a receiver of an optical sensing system. The receiver may include a Hadamard mask configured to resonate during a scanning procedure performed by the optical sensing system. The Hadamard mask may include a frame beginning pattern corresponding to a start of a frame captured during the scanning procedure. The Hadamard mask may also include a coded pattern configured to provide sub-pixelization of the frame. The receiver may also include a photodetector array positioned on a first side of the Hadamard mask. The photodetector array may be configured to detect light that passes through the Hadamard mask during the scanning procedure to generate the frame.

Embodiments of the disclosure may include an optical sensing system. The optical sensing system may include a transmitter configured to emit light towards an environment during a scanning procedure. The optical sensing system may also include a receiver. The receiver may include a Hadamard mask configured to resonate during the scanning procedure. The Hadamard mask may include a frame beginning pattern corresponding to a start of a frame captured during the scanning procedure. The Hadamard mask may also include a coded pattern configured to provide sub-pixelization of the frame. The receiver may also include a photodetector array positioned on a first side of the Hadamard mask. The photodetector array may be configured to detect the light returning from the environment that passes through the Hadamard mask during the scanning procedure to generate the frame.

Embodiments of the disclosure may include a scanning method of an optical sensing system to capture a frame. The method may include emitting light towards an environment. The method may also include causing a Hadamard mask to resonate. The method may further include identifying a start signal indicating a beginning of the frame when the light reflected from the environment passes through a frame beginning pattern of the Hadamard mask. The method may further include detecting, by a photodetector array, the light reflected from the environment that passes through each of a plurality of rows in a coded pattern of the Hadamard mask in a sequential manner. The method may also include generating the frame based on the sequentially detected light.

It is to be understood that both the foregoing general description and the following detailed description are exemplary and explanatory only and are not restrictive of the invention, as claimed.

DETAILED DESCRIPTION

Figure 1:
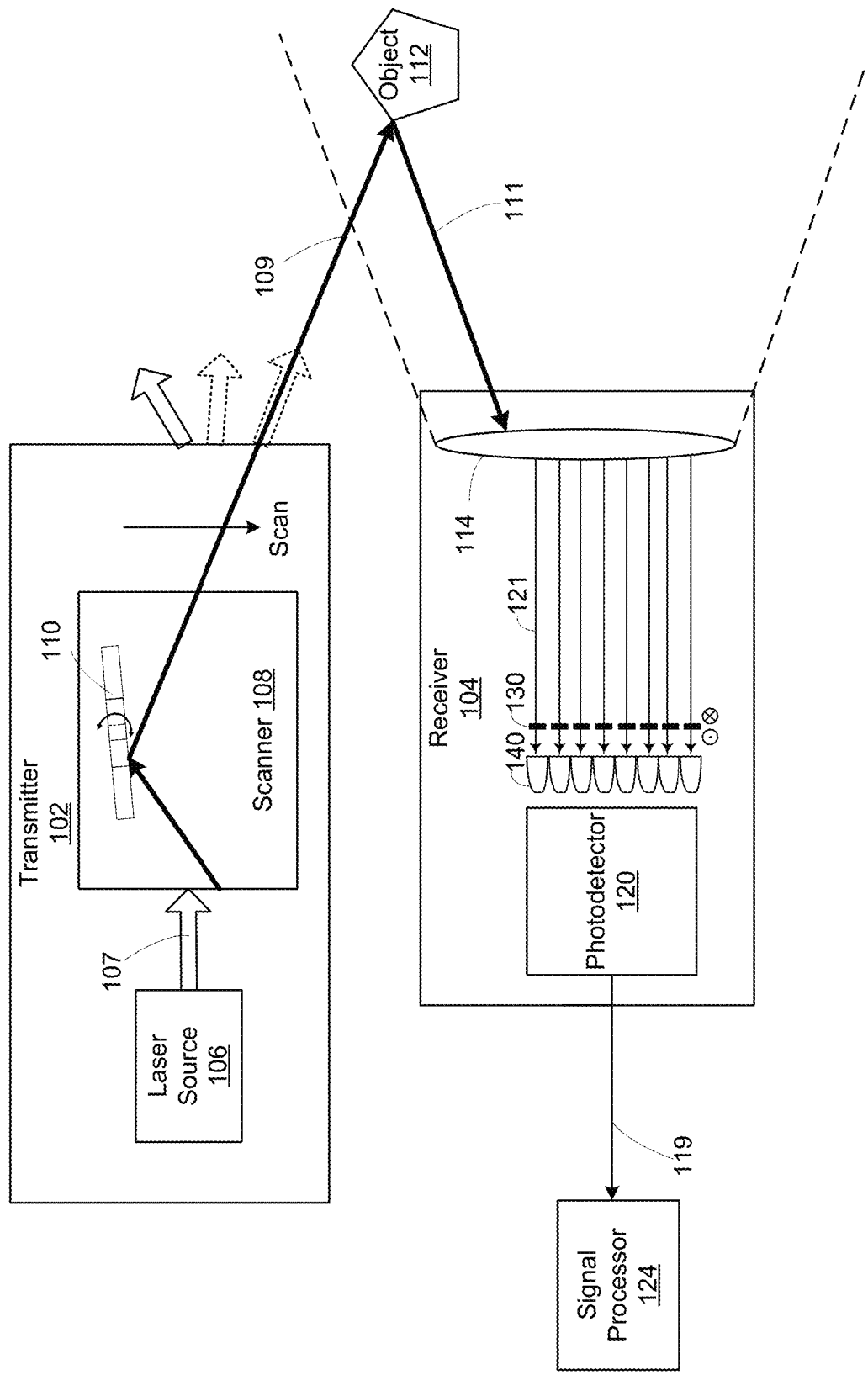
FIG. 1 illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

Due to the challenges imposed by the prohibitive size of the laser array and photodetector array in order to achieve a desired detection resolution in conventional solid-state systems, as discussed in the BACKGROUND section above, the present disclosure provides a Hadamard mask configured to resonate during a scanning procedure to provide sub-pixelization of a frame captured using a laser array and photodetector array of reduced size. The Hadamard mask may include, e.g., a frame beginning pattern corresponding to a start of a frame captured during the scanning procedure and a coded pattern including multiple rows of coded regions arranged in a grid configured to provide sub-pixelization of the frame. More specifically, the Hadamard mask of the present disclosure is configured to resonate in front of the photodetector array to align each of its rows with the photodetector array in a sequential manner. The photodetector array may be configured to sequentially detect light passing through a slit apparatus (e.g., located between the Hadamard mask and the far field environment) and impinging on each of the plurality of rows of the Hadamard mask grid individually. The Hadamard mask may resonate according to a timing sequence. As a result, at different times, the light received by the photodetector array is filtered by different spatial filters and therefore, the sequentially received light signals are time-spatial encoded. In some embodiments, the Hadamard mask may be coupled to an actuator configured to generate a displacement force that causes the Hadamard mask to resonate during the scanning procedure. When the actuator is of the piezoelectric-type, one or more displacement amplifiers may be coupled between the Hadamard mask and the actuator to amplify the displacement force applied to the Hadamard mask. By implementing sub-pixelization using a resonating Hadamard mask, the size and cost of the laser array and/or the photodetector array of the present optical sensing system may be considerably reduced as compared to conventional systems.

Some exemplary embodiments are described below with reference to a receiver used in LiDAR system(s), but the application of the emitter array disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser sources 106 and a scanner 108.

Transmitter 102 can sequentially emit a stream of pulsed laser beams in different directions within a scan range (e.g., a range of scanning angles in angular degrees), as illustrated in FIG. 1. Laser source 106 may be configured to provide a laser beam 107 (also referred to as "native laser beam") to scanner 108. In some embodiments of the present disclosure, laser source 106 may generate a pulsed laser beam in the ultraviolet, visible, or near infrared wavelength range. Laser beam 107 may diverge in the space between the laser source 106 and the scanner 108. Thus, although not illustrated, transmitter 102 may further include a collimating lens located between laser source 106 and scanner 108 and configured to collimate divergent laser beam 107 before it impinges on scanner 108.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser source 106 for emitting laser beam 107.

Scanner 108 may be configured to steer a laser beam 109 towards an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles. In some embodiments consistent with the present disclosure, scanner 108 may include a micromachined mirror assembly (also referred to herein as "scanning mirror assembly") that is comprised of a plurality of elements. One such element is a scanning mirror, such as a MEMS mirror 110 illustrated in FIG. 1. Although not shown in FIG. 1, the scanning mirror assembly of scanner 108 may also include various other elements. For example, these other elements may include, without limitation, a MEMS actuator, actuator anchor(s), a plurality of interconnects, scanning mirror anchor(s), just to name a few.

In some embodiments, receiver 104 may be configured to detect a returned laser beam 111 returned from object 112. Returned laser beam 111 may be returned from object 112 and have the same wavelength as laser beam 109. Returned laser beam 111 may be in a different direction from laser beam 109. Receiver 104 can collect laser beams returned from object 112 and output electrical signals reflecting the intensity of the returned laser beams. Upon contact, laser beam 109 can be reflected by object 112 via backscattering, e.g., such as Raman scattering and/or fluorescence.

Figure 2A:
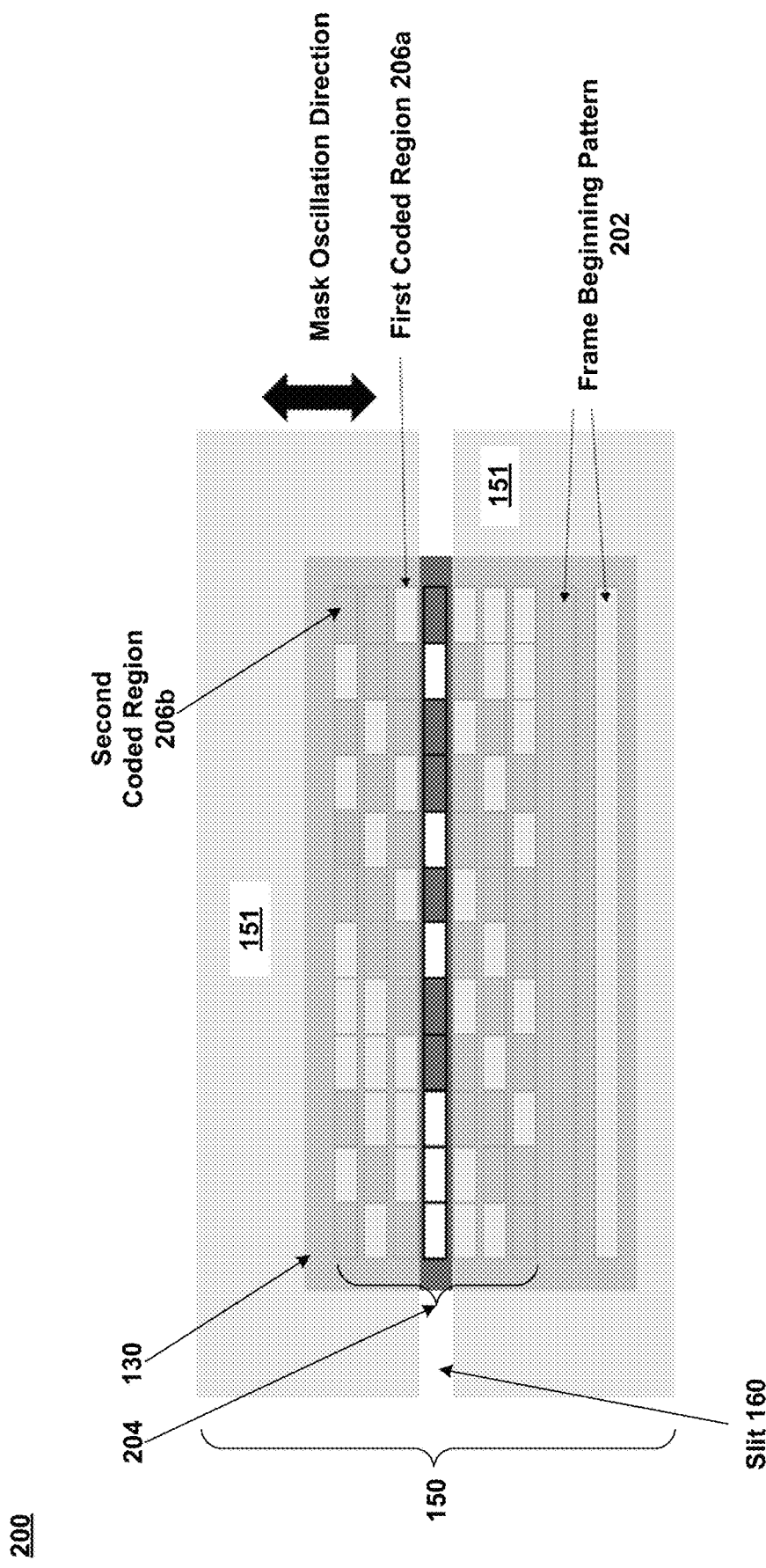
FIG. 2A illustrates a detailed view of an exemplary Hadamard mask and slit apparatus, according to embodiments of the disclosure.

As illustrated in FIG. 1, receiver 104 may receive the returned laser beam 111. Receiver 104 may include, among others, a lens 114, a slit apparatus (e.g., such as slit apparatus 150 depicted in FIG. 2A), a Hadamard mask 130, a light collector array 140, and a photodetector array 120. Lens 114 may be configured to collect light from a respective direction in its FOV and converge the laser beam 121 to focus before it is received on the slit apparatus. The slit apparatus may include opaque regions (as shown in FIG. 2A) that block light passage and a slit (also as shown in FIG. 2A) or transparent region that enables light passage through to Hadamard mask 130.

Figure 2B:
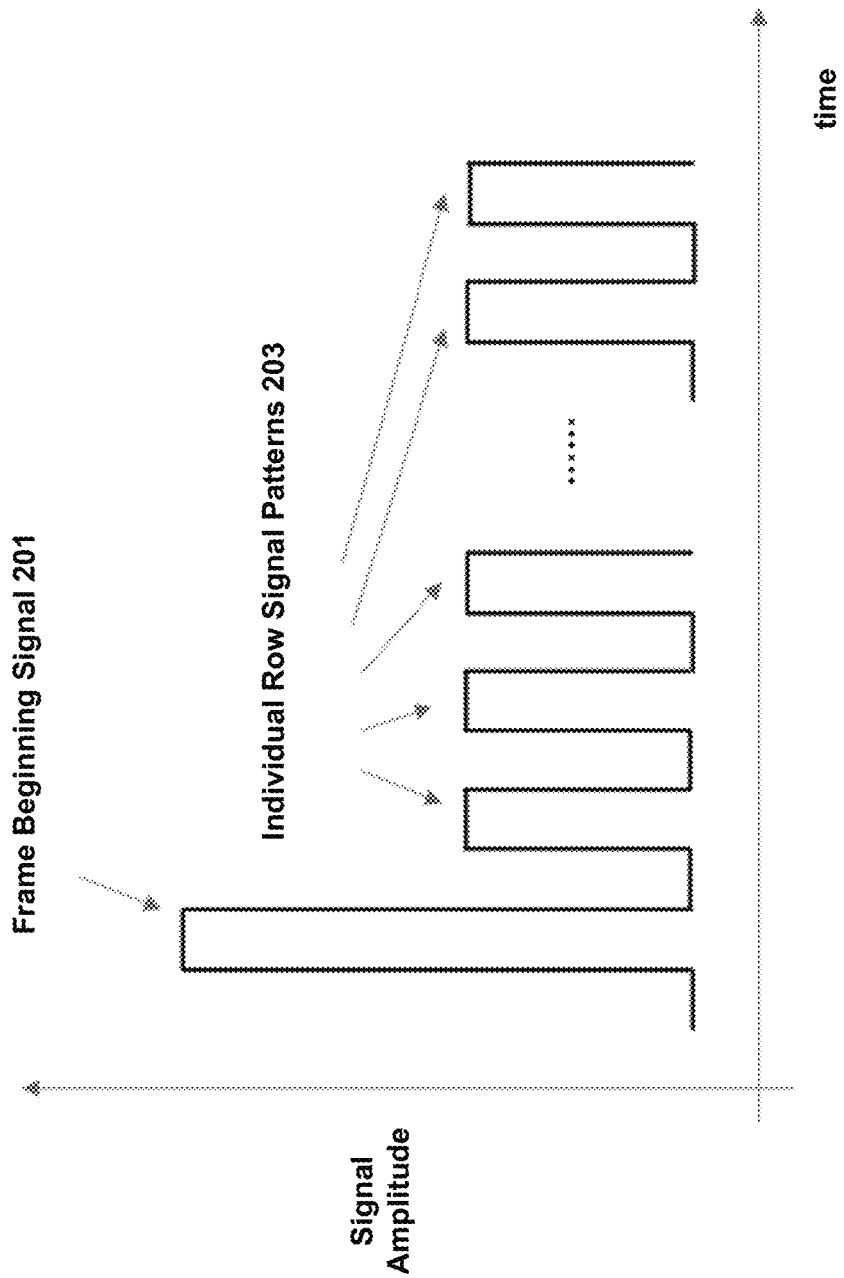
FIG. 2B illustrates a graphical representation of a timing sequence of an exemplary Hadamard mask based scanning procedure, according to embodiments of the disclosure.
Figure 2D:
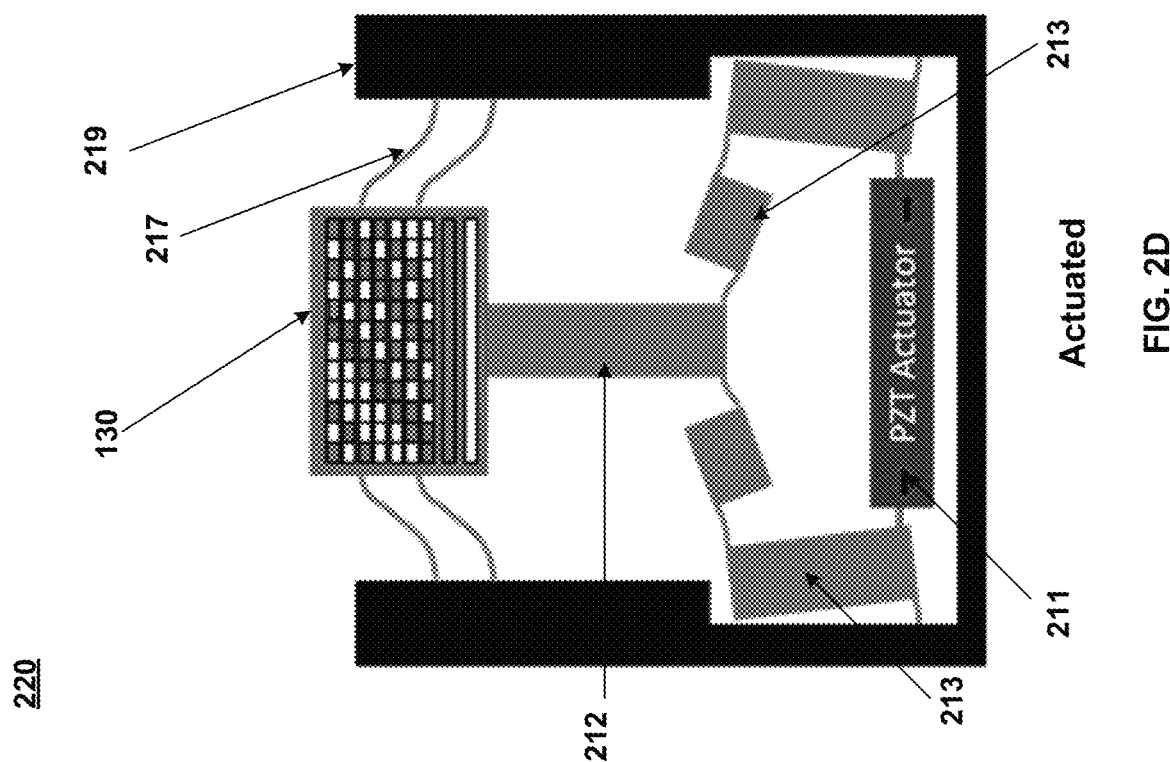
FIG. 2D illustrates a second detailed view of an exemplary Hadamard mask and a corresponding actuator with an applied displacement force, according to embodiments of the disclosure.
Figure 2C:
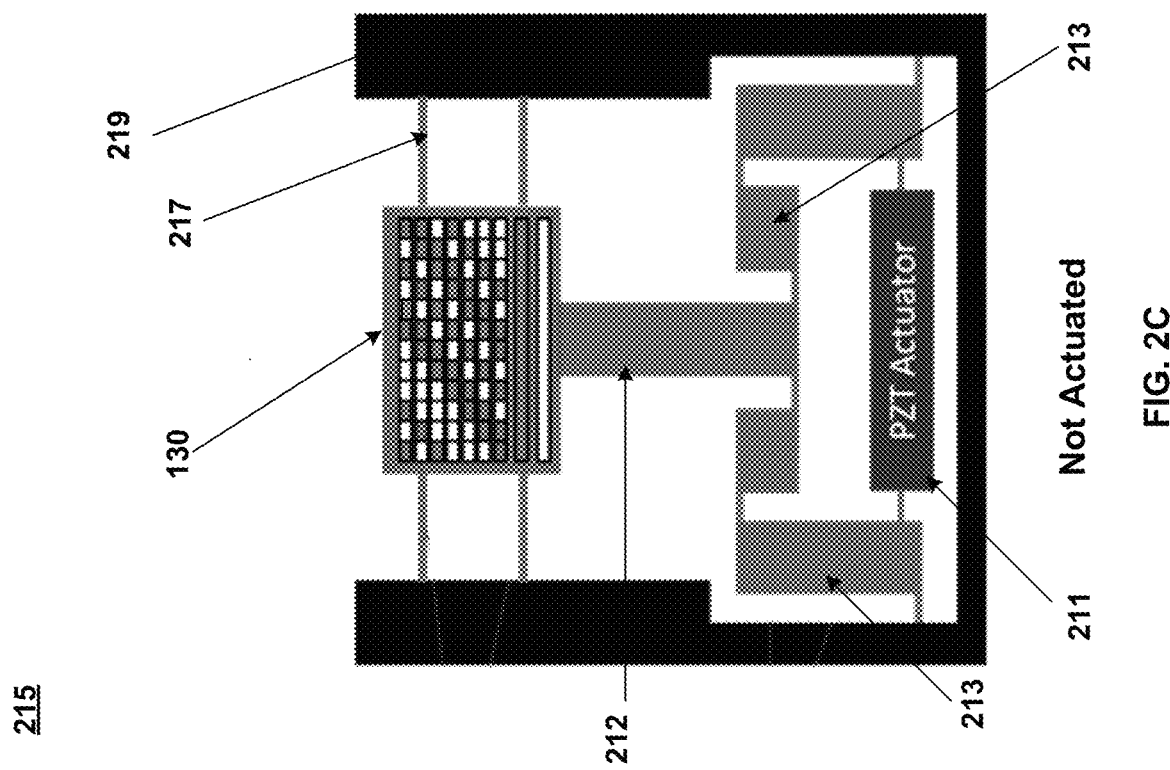
FIG. 2C illustrates a first detailed view of an exemplary Hadamard mask and a corresponding actuator without an applied displacement force, according to embodiments of the disclosure.

Hadamard mask 130 may include a frame beginning pattern configured to indicate the start of scan associated with a new frame. In certain implementations, the start of the scan may be associated with a new scanning angle of the scanning procedure. Moreover, Hadamard mask 130 may include a coded pattern comprised of a plurality of coded regions arranged in a plurality of rows and/or a grid, as shown in FIGS. 2A, 2C, and 2D. Each of the plurality of rows may include N number of coded regions, where each coded region is designed to either pass or block the light. The transparent and opaque regions (also referred to as "mask elements") all have an equal or substantially equal size and are distributed in a pre-determined pattern, which is placed on a regular grid that includes a plurality of rows of coded regions as illustrated in FIG. 2A. The width of the slit in the slit apparatus may be the same or similar as a single row of Hadamard mask 130 such that at each point in time light impinges on a single row of the mask during the line-scanning procedure. In the example illustrated in FIG. 1, Hadamard mask 130 may resonate in and out of the plane of the page by the application of a displacement force caused by an actuator (e.g., such as actuator 211 depicted in FIGS. 2C and 2D) coupled to Hadamard mask 130.

During the line-scan, returned laser beam 111 may be collected by lens 114 as laser beam 121, which passes through the slit of the slit apparatus. The light passing through the slit impinges on only the row of the Hadamard mask 130 that is aligned with the slit at that point in time. The incoming light passing through Hadamard mask 130 may be larger than the sensitive area of the photodetector array 120. Thus, receiver 104 may include a light collector array 140 (e.g., V-trough light collector, compound parabolic collector (CPC), etc.), which may be configured to enhance the light collection efficiency in front of photodetector array 120.

Photodetector array 120 may have a spatial resolution sufficiently matched to the grid size of Hadamard mask 130. Photons from laser beam 121 that pass through the transparent coded regions of Hadamard mask 130 project onto photodetector array 120. Due to the slit apparatus, a single row of the coded pattern may be projected on photodetector array 120 at any given time. In other words, the light received by photodetector array 120 at a particular time is coded by the pattern of Hadamard mask 130 that is aligned with the slit at that time. As Hadamard mask 130 resonates and shifts in space, the encoded pattern aligned with the slit changes over time, therefore changing the encoding of the received light at photodetector array 120. For each frame, photodetector array 120 may receive multiple lines of light signals corresponding to the rows of encoded patterns on Hadamard mask 130 during a line-scanning procedure. After a certain illumination period (e.g., when each of the rows have been scanned for a particular frame), the received lines of light signals may be decoded to generate an image of the far field environment by the signal processor 124. Signal processor 124 may decode the received signals according to the known encodings on Hadamard mask 130 and its timing sequence. By encoding the received signals through Hadamard mask 130 and then decoding the signals, LiDAR system 100 is able to increase the sub-pixelization of the frame beyond that provided by the pixelization of photodetector array 120.

Photodetector array 120 may convert the laser light (e.g., returned laser beam 111) collected by lens 114 into laser beam 121 into an electrical signal 119 (e.g., a current or a voltage signal). Electrical signal 119 may be generated when photons are absorbed in a photodiode included in photodetector array 120. In some embodiments of the present disclosure, photodetector array 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by photodetector array 120. Signal processor 124 may process electrical signal 119 to determine, for example, distance information carried by electrical signal 119. Signal processor 124 may construct a point cloud based on the processed information. The point cloud may include a frame, which is an image of the far field at a particular point in time. In this context, a frame is the data/image captured of the far field environment at each scanning angle. Signal processor 124 may include a microprocessor, a microcontroller, a central processing unit (CPU), a graphical processing unit (GPU), a digital signal processor (DSP), or other suitable data processing devices. By including the slit apparatus, Hadamard mask 130, and light collector array 140 in receiver 104, the frame generated by signal processor 124 may have a larger pixel number than photodetector array 120, thereby reducing the size and cost of the present optical sensing system, e.g., as described in additional detail below in connection with FIGS. 2A, 2B, 2C, 2D, and 3.

FIG. 2A illustrates a diagram 200 of an exemplary Hadamard mask 130 and slit apparatus 150, according to embodiments of the disclosure. FIG. 2B illustrates a graphical representation 210 of a timing sequence of an exemplary Hadamard mask based scanning procedure, according to embodiments of the disclosure. FIG. 2C illustrates a first diagram 215 of an exemplary Hadamard mask and a corresponding actuator without an applied displacement force, according to embodiments of the disclosure. FIG. 2D illustrates a second diagram 220 of an exemplary Hadamard mask and a corresponding actuator with an applied displacement force, according to embodiments of the disclosure. FIGS. 2A, 2B, 2C, and 2D will be described together.

As mentioned above, receiver 104 may include a slit apparatus 150, such as the one illustrated in FIG. 2A. Slit apparatus 150 may be a fixed structure that does not oscillate during a scanning procedure and is positioned between the lens 114 and the Hadamard mask 130 illustrated in FIG. 1.

Referring to FIG. 2A, slit apparatus 150 may include a pair of opaque structures 151 configured to block the passage of light. Slit apparatus 150 may also include a slit 160 that is located between the opaque structures 151 and configured to allow the passage of light. Although shown as two structures separated by a slit, slit apparatus 150 may be any shaped structure with a hole and/or slit through which laser beam 121 can pass. Slit 160 may be an opening, a hole, or a transparent material, or any other configuration that allows light to pass unobstructed.

As seen in FIG. 2A, Hadamard mask 130 may include a frame beginning pattern 202 and a coded pattern 204. Frame beginning pattern 202 and different rows of coded pattern 204 may sequentially align with slit 160 during a line-scanning procedure by resonating Hadamard mask 130. Each of the frame beginning pattern 202 and the coded pattern 204 may include opaque regions (depicted with grey in FIGS. 2A, 2C, and 2D), which are configured to block the passage of laser beam 121. Moreover, frame beginning pattern 202 and coded pattern 204 each include transparent regions (depicted with white in FIGS. 2A, 2C, and 2D) configured to allow the passage of laser beam 121.

Depending on the desired sub-pixelization, each row of Hadamard mask 130 may be divided into X first coded regions 206a and Y second coded regions 206b, where X and Y may be the same number or different. Each of first coded regions 206a may be transparent and portions of laser beam 121 that pass through slit 160 may also pass through these first coded regions 206a. On the other hand, second coded regions 206b may be opaque and configured to block the passage of laser beam 121 during the line-scanning procedure. In certain implementations, there may be N rows in coded pattern 204 to provide sufficient information collection at photodetector array 120 and signal processor 124. In certain implementations, the N rows may be equal in number to one or more of the X first coded regions 206a and/or the Y second coded regions 206b. In certain other implementations, the N rows may be different in number than one or more of the X first coded regions 206a and/or the Y second coded regions 206b.

By scanning through each of the rows in Hadamard mask 130, different parts of laser beam 121 containing different information about the far field may then impinge upon photodetector array 120. Using line-scanning of Hadamard mask 130, a larger amount of information can be collected using a photodetector array 120 of reduced size. For example, using Hadamard mask 130 and a line-scanning procedure to implement sub-pixelization, the size of photodetector array 120 may be reduced by N fold, as compared with known systems. The line-scanning procedure is described below.

For example, scanner 108 of FIG. 1 steers laser beam 109 at a particular scanning angle (associated with an individual frame) towards object 112. Then, reflected laser beam 111 is collected by lens 114 into collimated laser beam 121 that passes through slit 160 of slit apparatus 150 and impinges on Hadamard mask 130. At the beginning of a scanning procedure for a new frame, frame beginning pattern 202 is aligned with slit 160 such that laser beam 121 passes through its transparent region and impinges on photodetector array 120. An electrical signal proportional to the number of photons impinging on photodetector array 120 is sent to signal processor 124. Then, Hadamard mask 130 oscillates downward and laser beam 121 impinges on each row of coded pattern 204 sequentially.

Frame beginning pattern 202 may be integrated into Hadamard mask 130 such that the start signal 201 (depicted in FIG. 2B) of each frame can be identified based on the signal amplitude. In some embodiments, frame beginning pattern 202 may include a larger transparent region than the collective size of first coded regions 206a in any row in encoded pattern 204 to allow a distinguishable amount of light to pass through. Accordingly, signal processor 124 shown in FIG. 1 may identify the start of a new frame when the received signal has the highest amplitude (e.g., start signal 201). As illustrated in FIG. 2B, the amplitude of start signal 201 is larger than the amplitude of the any individual signal of signal pattern 203, where each individual signal is associated with one of the rows in coded pattern 204. Because the transparent region(s) of frame beginning pattern 202 allows the largest number of photons from laser beam 121 to pass therethrough, the signal amplitude of start signal 201 is distinguishable from those signals in signal pattern 203, where each signal in signal pattern 203 is associated with one row in coded pattern 204.

By forming a frame beginning pattern 202 in Hadamard mask 130, signal processor 124 may identify the beginning of a new frame when the signal amplitude meets a threshold level associated with the start of a new frame. Identifying a new frame based on a signal amplitude may reduce the time and computational resources used by signal processor 124 to identify the start of a new frame in the line-scanning procedure, as compared to using a Hadamard mask without frame beginning pattern 202.

Then, as Hadamard mask 130 resonates, it is shifted downward row-by-row such that each row of coded pattern 204 receives laser beam 121 sequentially, and photodetector array 120 may output an individual signal of signal pattern 203 containing image/data of the far field environment as encoded by the corresponding row of encoded pattern 204. Once each of the rows of coded pattern 204 has been scanned (e.g., once laser beam 121 has impinged on each of the rows), scanner 108 may select the next scanning angle and adjust MEMS mirror 110 such that laser beam 109 is directed toward object 112 at the new scanning angle. While at the same time, Hadamard mask 130 oscillates downward such that the frame beginning pattern 202 is re-aligned with slit 160 of slit apparatus 150 for the start of the new frame. The line-scanning procedure then continues in the same or similar manner as described above for the previous frame. The mechanism by which Hadamard mask 130 is made to oscillate will be described below in connection with FIGS. 2C and 2D.

Referring to FIGS. 2C and 2D, Hadamard mask 130 may be coupled to a fixed structure 219 using one or more torsion springs 217. Fixed structure 219 may be coupled to a substrate or another structure of receiver 104. Hadamard mask 130 may be caused to oscillate/resonate using an actuator 211 that is coupled to a series of displacement amplifiers 213 (also referred to as "mechanical amplifiers"), which are also coupled to handle 221. Displacement amplifiers 213 provide a linkage mechanisms that amplify the magnitude of the displacement force generated by actuator 211. In the example illustrated in FIGS. 2C and 2D, actuator 211 is a piezoelectric amplifier formed from a piezoelectric material, e.g., such as lead zirconium titanate (PZT). When a voltage is applied to the PZT, actuator 211 deforms, and thus, generates the displacement force. One advantage of using a piezoelectric actuator 211, as compared to electronic and hydraulic type actuators, is the fast response, large generation pressure, and highly accurate operation resonance. While PZT can generate enough power to drive Hadamard mask 130 over a long range, the amount of expansion on PZT itself is not particularly large. Hence, by including several stages of displacement amplifiers 213, the displacement force applied to Hadamard mask 130 may be amplified such that it may perform the oscillation function described above in connection to the line-scanning procedure. However, it is contemplated that actuator 211 is not limited to the PZT actuator illustrated in FIGS. 2C and 2D. Instead, actuator 211 may be any type of actuator that causes Hadamard mask 130 to resonate during a scanning procedure without departing from the scope of the present disclosure.

Figure 3:
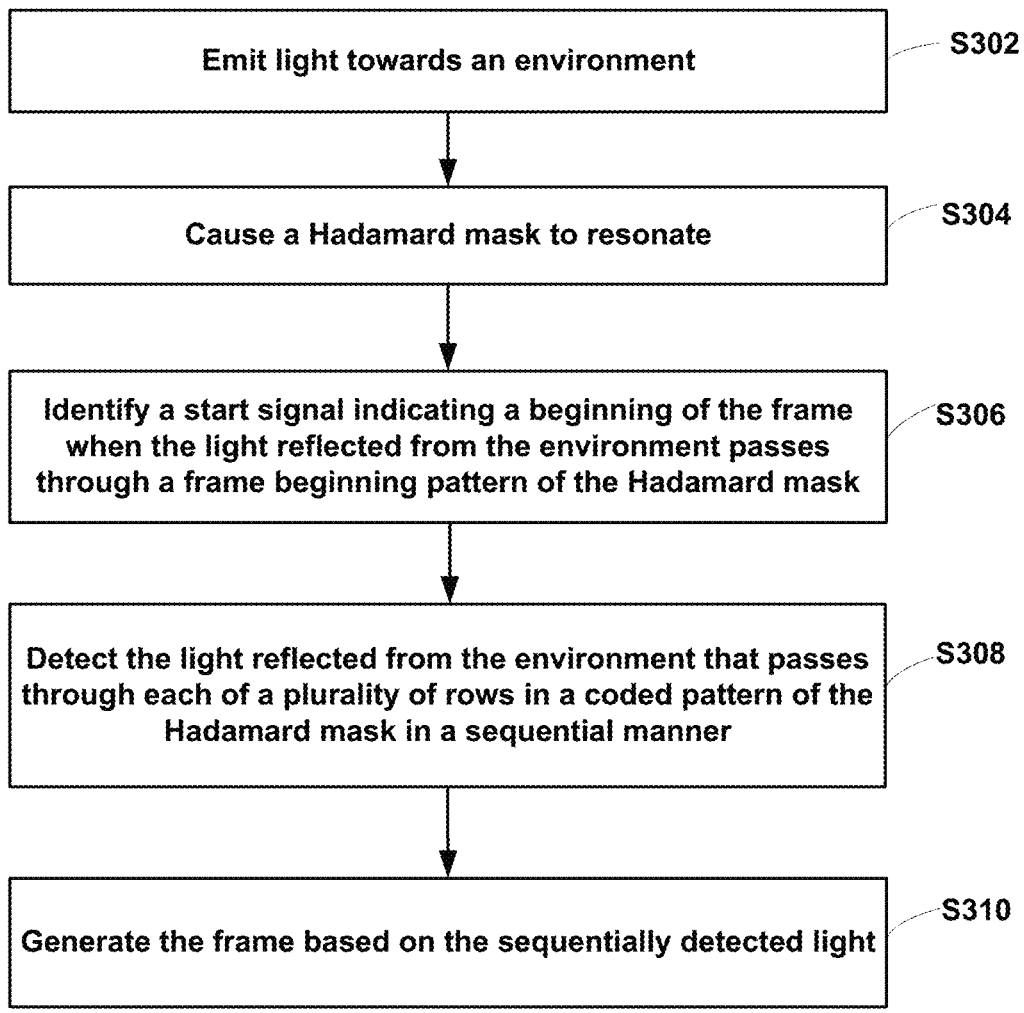
FIG. 3 illustrates a flow chart of an exemplary scanning method of an optical sensing system, according to embodiments of the disclosure.

FIG. 3 illustrates a flowchart of an exemplary scanning method 300 of an optical sensing system, according to embodiments of the disclosure. Exemplary scanning method 300 may be performed by exemplary LiDAR system 100 or any other type of optical sensing system and used to capture a frame. Scanning method 300 may include steps S302-S310 as described below. It is to be appreciated that some of the steps may be optional, and some of the steps may be performed simultaneously, or in a different order than shown in FIG. 3.

Referring to FIG. 3, at step S302, the optical sensing system may emit light towards an environment. For example, referring to FIG. 1, laser source 106 may be configured to provide a laser beam 107 (also referred to as "native laser beam") to scanner 108. In some embodiments of the present disclosure, laser source 106 may generate a pulsed laser beam in the ultraviolet, visible, or near infrared wavelength range. Laser beam 107 may diverge in the space between the laser source 106 and the scanner 108. Thus, although not illustrated, transmitter 102 may further include a collimating lens located between laser source 106 and scanner 108 and configured to collimate divergent laser beam 107 before it impinges on scanner 108. Scanner 108 may be configured to steer laser beam 107 into a laser beam 109 towards an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles.

At step 304, the optical sensing system may cause a Hadamard mask to resonate. For example, referring to FIGS. 2C and 2D, Hadamard mask 130 may be coupled to a structure 219 using one or more torsion springs 217. Structure 219 may be coupled to a substrate or another structure of receiver 104. Hadamard mask 130 may be caused to oscillate using an actuator 211 that is coupled to a series of displacement amplifiers 213 (also referred to as "mechanical amplifiers"), which are also coupled to handle 221.

In certain implementations, at step S304, the optical sensing system may cause the Hadamard mask to resonate by generating a displacement force using an actuator to move the Hadamard mask relative to the photodetector array such that the plurality of rows are aligned with the photodetector array sequentially. For example, referring to FIGS. 2C and 2D, displacement amplifiers 213 are a linkage mechanisms that amplify the magnitude of the displacement generated by actuator 211. In the example illustrated in FIGS. 2C and 2D, actuator 211 is a piezoelectric amplifier formed form a piezoelectric material, e.g., such as lead zirconium titanate (PZT). When a voltage is applied to piezoelectric actuator 211, the piezoelectric material deforms depending on the amount of voltage applied thereto. One advantage of using a piezoelectric actuator 211, as compared to electronic and hydraulic type actuators, is the fast response, large generation pressure, and highly accurate operation resonance. While PZT can generate enough power to drive Hadamard mask 130 over a long range, the amount of expansion on PZT itself is not particularly large. Hence, by utilizing several stages of displacement amplifiers 213, the displacement applied to Hadamard mask 130 may be increased such that it may perform the oscillation function described above in connection to the line-scanning procedure.

At step S306, the optical sensing system may identify a start signal indicating a beginning of the frame when the light reflected from the environment passes through a frame beginning pattern of the Hadamard mask. For example, referring to FIGS. 2A and 2B, frame beginning pattern 202 may be integrated into Hadamard mask 130 such that the start signal 201 (depicted in FIG. 2B) of each frame can be identified based on the signal amplitude. For example, signal processor 124 shown in FIG. 1 may identify the start of a new frame based on the amplitude of start signal 201. Referring to FIG. 2B, frame beginning pattern 202 is designed such that the amplitude of start signal 201 is larger than the amplitude of each signal in the signal pattern 203 associated with the of the rows in coded pattern 204. This is because the transparent region of frame beginning pattern 202 allows a greater number of photons of laser beam 121 to pass therethrough, as compared to the first coded regions 206a in any given row. Because the transparent region of frame beginning pattern 202 allows a larger number of photons from laser beam 121 to pass therethrough, the signal amplitude of start signal 201 is distinguishable from those signals in signal pattern 203, where each signal in signal pattern 203 is associated with one row in coded pattern 204. By forming a frame beginning pattern 202 in Hadamard mask 130, signal processor 124 may identify the beginning of a new frame when the signal amplitude meets a threshold level associated with frame beginning pattern 202. Identifying a new frame based on a signal amplitude may reduce the time and computational resources used by signal processor 124 to identify the start of a new frame in the line-scanning procedure, as compared to using a Hadamard mask without frame beginning pattern 202.

At step S308, the optical sensing system may detect, by a photodetector array, the light reflected from the environment that passes through each of a plurality of rows in a coded pattern of the Hadamard mask in a sequential manner. For example, referring to FIG. 1, photodetector array 120 may have a spatial resolution sufficiently matched to the grid size of Hadamard mask 130. Photons from laser beam 121 that pass through the transparent coded regions of Hadamard mask 130 project onto photodetector array 120. Due to the slit apparatus, a single row of the coded pattern may be projected on photodetector array 120 at any given time. In other words, the light received by photodetector array 120 at a particular time is coded by the pattern of Hadamard mask 130 that is aligned with the slit at that time. As Hadamard mask 130 resonates and shifts in space, the encoded pattern aligned with the slit changes over time, therefore changing the encoding of the received light at photodetector array 120. For each frame, photodetector array 120 may receive multiple lines of light signals corresponding to the rows of encoded patterns on Hadamard mask 130 during a line-scanning procedure.

At step S310, the optical sensing system may generate the frame based on the detected light. For example, referring to FIG. 1, for each frame, photodetector array 120 may accumulate the sum of the shifted mask patterns during a line-scanning procedure. Each shift encodes the position and its strength encodes the intensity of the returned laser beam 111 at that position. Each part of the photodetector array 120 may detect photons incident from any position within the far field. After a certain illumination period (e.g., when each of the rows have been scanned for a particular frame), the accumulated shifted mask patterns may be decoded as snapshot image of the far field environment by the signal processor 124 by determining the strength of every possible shifted mask pattern for the frame, thereby increasing the sub-pixelization of the frame.

As illustrated in FIG. 1, transmitter 102 can sequentially emit a stream of pulsed laser beams in different directions within a scan range (e.g., a range in angular degrees or scanning angles). After the frame for the current scanning angle is generated in step S310, Hadamard mask 130 oscillates downward such that the frame beginning pattern 202 is re-aligned with slit 160 of slit apparatus 150 for the start of the new frame. The line-scanning procedure then continues in the same or similar manner as described above for the previous frame. Method 300 may repeat steps S302-S310 for the next scanning angle to generate the next frame.

It is intended that the specification and examples be considered as exemplary only, with a true scope being indicated by the following claims and their equivalents.

What is claimed is:

1. A receiver of an optical sensing system, comprising:
   a slit apparatus;
   a Hadamard mask configured to resonate during a scanning procedure performed by the optical sensing system, the Hadamard mask comprising:
      a frame beginning pattern configured to be aligned with a slit of the slit apparatus to identify a start of a frame at a new scanning angle captured during the scanning procedure; and
      a coded pattern configured to be aligned with the slit of the slit apparatus after the frame beginning pattern to provide sub-pixelization of the frame at said scanning angle; and
   a photodetector array positioned on a first side of the Hadamard mask opposite to the slit apparatus, the photodetector array configured to detect light that passes through the Hadamard mask during the scanning procedure to generate the frame.

2. The receiver of claim 1, wherein each coded pattern comprises a plurality of coded regions arranged in a plurality of rows.

3. The receiver of claim 2, wherein each of the plurality of rows comprise a N number of coded regions, each coded region is designed to either pass or block the light.

4. The receiver of claim 3, wherein the Hadamard mask moves relative to the photodetector array as it resonates such that the plurality of rows of coded regions are aligned with the photodetector array sequentially during the scanning procedure.

5. The receiver of claim 2,
   wherein the slit in the slit apparatus has a same width as a single row of the plurality of rows.

6. The receiver of claim 5, wherein to capture the frame, the Hadamard mask is configured to resonate to align each of the plurality of rows with the photodetector array in a sequential manner; and
   the photodetector array is configured to sequentially detect light passing through the slit and impinging on each of the plurality of rows individually.

7. The receiver of claim 1, wherein the Hadamard mask further comprises:
   an actuator configured to generate a displacement force that causes the Hadamard mask to resonate during the scanning procedure.

8. The receiver of claim 7, wherein the Hadamard mask further comprises:
   at least one displacement amplifier coupled to the actuator and configured to amplify the displacement force generated by the actuator during the scanning procedure before applied to the Hadamard mask.

9. The receiver of claim 1, further comprising:
   a light collector array aligned with the photodetector array and configured to concentrate the light that passes through the Hadamard mask during the scanning procedure before directing the light to the photodetector array.

10. The receiver of claim 9, wherein the light collector array is located on the side of the Hadamard mask opposite to the slit structure and between the Hadamard mask and the photodetector array.

11. The receiver of claim 9, wherein the light collector array comprises a plurality of trough collectors.

12. The receiver of claim 11, wherein the trough collectors are a V-trough collectors.

13. The receiver of claim 11, wherein the trough collectors are compound parabolic collectors (CPCs).

14. An optical sensing system, comprising:
   a transmitter configured to emit light towards an environment during a scanning procedure; and
   a receiver comprising:
      a frame beginning pattern configured to be aligned with a slit of the slit apparatus to identify a start of a frame at a new scanning angle captured during the scanning procedure; and
      a coded pattern configured to be aligned with the slit of the slit apparatus after the frame beginning pattern to provide sub-pixelization of the frame at said scanning angle; and
      a photodetector array positioned on a side of the Hadamard mask opposite to the slit apparatus, the photodetector array configured to detect light that passes through the Hadamard mask during the scanning procedure to generate the frame.

15. The optical sensing system of claim 14, wherein the Hadamard mask further comprises:
   an actuator configured to generate a displacement force that causes the Hadamard mask to resonate during the scanning procedure; and
   at least one displacement amplifier coupled to the actuator and configured to amplify the displacement force generated by the actuator before the displacement force is applied to the Hadamard mask.

16. The optical sensing system of claim 14, further comprising:
   a light collector array aligned with the photodetector array and configured to concentrate the light that passes through the Hadamard mask during the scanning procedure before directing the light to the photodetector array,
      wherein the light collector array is one of a V-trough array or a compound parabolic collector (CPC) array.

17. The optical sensing system of claim 14, wherein the transmitter and the receiver are biaxial or coaxial.

18. The optical sensing system of claim 14, further comprising:

a scanner configured to steer the light towards the environment in a plurality of scanning angles,
wherein the receiver is configured to capture one frame at each scanning angle using the Hadamard mask and the photodetector array.

19. A scanning method of an optical sensing system to capture a frame, comprising:
emitting light towards an environment;
causing a Hadamard mask to resonate, the Hadamard mask comprising a frame beginning pattern and a coded pattern;
identifying a start signal indicating a beginning of the frame at a new scanning angle when the light reflected from the environment passes through the frame beginning pattern of the Hadamard mask aligned with a slit of a slit apparatus;
detecting, by a photodetector array, the light reflected from the environment that passes through each of a plurality of rows in the coded pattern of the Hadamard mask aligned with the slit of the slit apparatus after the frame beginning pattern in a sequential manner; and
generating the frame based on the sequentially detected light.

20. The scanning method of claim 19, wherein causing the Hadamard mask to resonate further comprises:
generating a displacement force using an actuator to move the Hadamard mask relative to the photodetector array such that the plurality of rows are aligned with the photodetector array sequentially.

* * * * *